United States Patent [19]

Sugiyama

[11] Patent Number: 5,315,326
[45] Date of Patent: May 24, 1994

[54] EFFICIENT CODING/DECODING APPARATUSES FOR PROCESSING DIGITAL IMAGE SIGNAL

[75] Inventor: Kenji Sugiyama, Yokosuka, Japan

[73] Assignee: Victor Company of Japan, Ltd., Yokohama, Japan

[21] Appl. No.: 873,949

[22] Filed: Apr. 24, 1992

[30] Foreign Application Priority Data
  Apr. 26, 1991 [JP] Japan .................. 3-125393

[51] Int. Cl.[5] .............................................. H04N 7/12
[52] U.S. Cl. ..................... 348/415; 348/416; 348/409
[58] Field of Search ............... 358/105, 133, 135, 136, 358/426, 432; 382/56; 348/409, 413, 415, 416, 417, 425, 430, 431; H04N 7/12, 1/41

[56] References Cited
U.S. PATENT DOCUMENTS

| | | | |
|---|---|---|---|
| 4,723,161 | 2/1988 | Koga | 358/136 |
| 4,924,298 | 5/1990 | Kitamura | 358/133 |
| 4,941,043 | 7/1990 | Jass | 358/133 |
| 5,025,482 | 6/1991 | Murakami et al. | 358/133 |
| 5,113,255 | 5/1992 | Nagata et al. | 358/133 |
| 5,227,877 | 7/1993 | Yukitake | 358/135 |
| 5,243,420 | 9/1993 | Hibi | 358/136 |

FOREIGN PATENT DOCUMENTS
W090  6/1990  World Int. Prop. O. .

*Primary Examiner*—Edward L. Coles, Sr.
*Assistant Examiner*—Kim Yen Vu
*Attorney, Agent, or Firm*—Jacobson, Price, Holman & Stern

[57] ABSTRACT

Efficient coding decoding apparatuses are permitted to easily carrying out, without degradation of the picture quality, random access, high speed search or image editing necessary in media of the storage system in a processing system for recording, transmitting, and displaying a digital signal, and to efficiently encode/decode an image signal with a lesser quantity of codes. An original image signal from a terminal (1) is coded by an orthogonal transformer (4) and a quantizer (36). A subtracter (33) subtracts, from the original image signal, a reproduced image signal obtained by an inverse quantizer (7) and an inverse orthogonal transformer (10) to provide a negative error signal. An adder (30) adds a negative error signal delayed by one frame and multiplied by a predetermined coefficient (Ke) at a multiplier (34) and the original image signal. As a result, an operation is carried out to multiply an error of a frame by the predetermined coefficient (Ke) to subtract it from an original image of the next frame to encode the subtracted signal to subtract its error from an original image signal of the further next frame. The value of the predetermined coefficient (Ke) is varied depending upon matching between images.

5 Claims, 5 Drawing Sheets

FIG. 9(a) ODD NUMBER / EVEN NUMBER

FIG. 9(b) ODD NUMBER / EVEN NUMBER

FIG. 9(c) ODD NUMBER / EVEN NUMBER

FIG. 9(d) ODD NUMBER / EVEN NUMBER

EFFICIENT CODING/DECODING APPARATUSES FOR PROCESSING DIGITAL IMAGE SIGNAL

BACKGROUND OF THE INVENTION

This invention relates to an efficient encoding apparatus adapted for efficiently encoding an image signal with a less quantity of codes and a decoding apparatus adapted for decoding such a coded signal in a processing system for recording, transmitting, and displaying a digital signal.

As an efficient coding technique utilizing image correlation, a "predictive coding" technology and a "orthogonal transform" technology are known as a most popular technology in recent years. In encoding a moving picture, the "prediction coding" technology is used for the interframe processing, and the "orthogonal transform" technology is used for the intraframe processing. Further, in the interframe prediction, there are many instances where a "motion compensation" to vary a predictive signal in correspondence with motion of a picture is carried out, and an orthogonally transformed and quantized predictive residual signal is replaced by a "variable length code".

A coding apparatus and a decoding apparatus in this case will be described.

Figure 1:
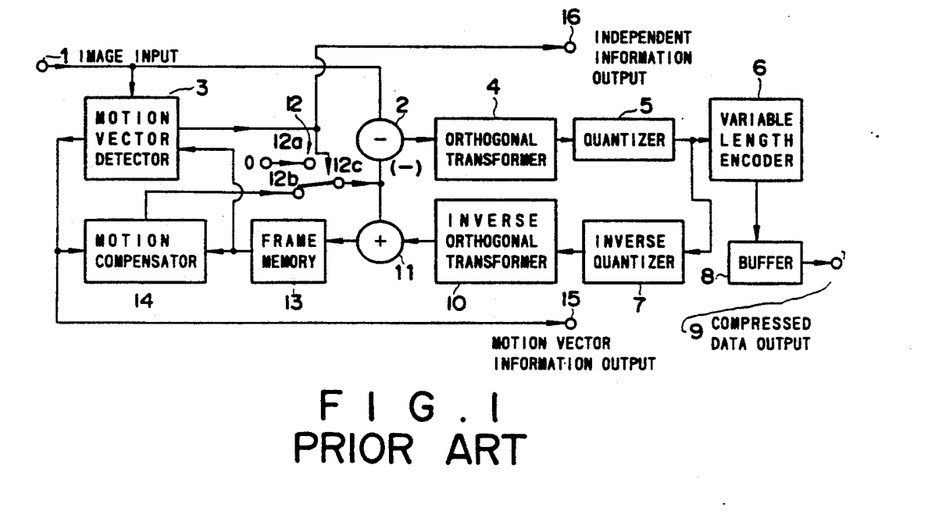
FIG. 1 is a block diagram showing a conventional coding apparatus.

FIG. 1 is a block diagram showing a conventional coding apparatus.

In FIG. 1, an original image signal inputted from an image input terminal 1 is delivered to a subtracter 2 and a motion vector detector 3. The subtracter 2 subtracts a predictive signal which will be described later from the original image signal to provide a predictive residual to deliver it to an orthogonal transformer or transform element 4. The orthogonal transformer 4 orthogonally transforms this predictive residual every block consisting of 8×8 pixels or so by the Discrete Cosine Transform (DCT) technique, etc. to deliver it to a quantizer 5. The quantizer 5 quantizes an input signal with a suitable accuracy. Since most of input signals take a value originally nearly equal to zero, most of output signals from the quantizer 5 also take zero.

An output signal from the quantizer 5 is delivered to a variable length encoder 6 and an inverse-quantizer 7. The variable length encoder 6 effect a processing such that when the input signal is equal zero, the encoder 6 converts the number of succession of signals to a variable length code such as a Huffman code, etc., and when the input signal takes a value except for zero, the encoder 6 converts that value to a variable length code, thereafter to deliver the variable length code thus obtained to a buffer 8 as compressed data. At this time, the rate of data outputted from the variable length encoder 6 is not fixed. Accordingly, that data is delivered to the buffer 8 so that it has a fixed rate. The data passed through the buffer 8 is outputted from a compressed data output terminal 9 to a decoding apparatus side.

On the other hand, a predictive signal delivered to the subtracter 2 is a signal earlier by one frame. In order to allow this predictive signal to be the same as that on the decoding apparatus side, this predictive signal is processed as follows.

The inverse-quantizer 7 inverse-quantizes a quantized signal which is an output signal of the quantizer 5 to replace it by a representative value of quantization to deliver it to an inverse orthogonal transformer 10. The inverse-orthogonal transformer 10 carries out an inverse transform processing of the orthogonal transformation to deliver its output signal to an adder 11. The adder 11 adds an output signal from the inverse orthogonal transformer 10 and a predictive signal delivered from a terminal 12c of a changeover switch 12 to provide the signal thus added as a reproduced image signal to deliver it to a frame memory 13. The frame memory 13 delays the reproduced image signal by one frame thereafter to deliver it to the motion vector detector 3 and a motion compensator 14.

The motion vector detector 3 searches motion of an image every about 16×16 pixels between an original image signal from the image input terminal 1 and a signal earlier by one frame from the frame memory 13 to obtain most accurate information to transmit it to the decoding apparatus side through a motion vector information output terminal 15, and to deliver it also to the motion compensator 14.

The motion compensator 14 implements a motion compensative processing to an output signal from the frame memory 13 in correspondence with a motion vector value delivered from the motion vector detector 3 to obtain a predictive signal to deliver it as a subtraction signal to the subtracter 2 through terminals 12b and 12c of the changeover switch 12.

The changeover switch 12 serves to ensure a suitable interframe prediction. The operation of the changeover switch 12 will now be described.

The motion vector detector 3 is adapted to output independent information for independently making coding without carrying out prediction in the case where a matching error between frames is large even if a motion vector is considered to be optimum to transmit such independent information to the decoding apparatus side through an independent information output terminal 16, and to deliver it also to the changeover switch 12.

The changeover switch 12 is switched, by this independent information, not to the 12b side (output of the motion compensator 14), but to a fixed value (0) on the 12a side, thus to inhibit interframe prediction.

Figure 2:
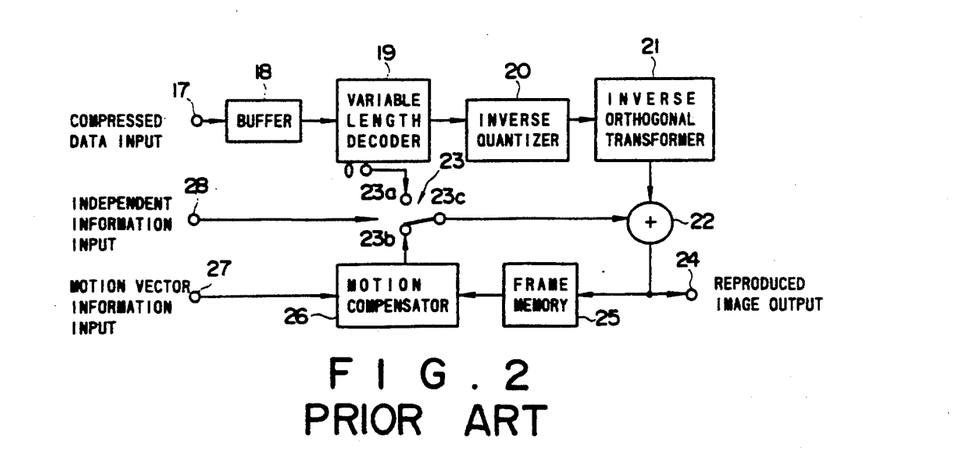
FIG. 2 is a block diagram showing a conventional decoding apparatus.

FIG. 2 is a block diagram showing a conventional decoding apparatus.

In FIG. 2, compressed data transmitted from the coding apparatus side shown in FIG. 1 is incoming through a compressed data input terminal 17 and a buffer 18, and is then delivered to a variable length decoder 19. The variable length decoder 19 converts a variable length code of the compressed data to a fixed length to deliver it to an inverse-quantizer 20. The inverse quantizer 20 inverse-quantizes an input signal to deliver it to an inverse orthogonal transformer 21.

The inverse-orthogonal transformer 21 implements an inverse orthogonal transform processing to that input signal to obtain a predictive residual signal to deliver it to an adder 22. The adder 22 adds the reproduced predictive residual signal and a predictive signal delivered from a changeover switch 23 to obtain a reproduced image signal to output it through a reproduced image output terminal 24, and to deliver it also to a frame memory 25.

The frame memory 25 delays the reproduced image signal by one frame thereafter to deliver it to a motion compensator 26. The motion compensator 26 carries out motion compensation of the reproduced image signal by motion vector information transmitted from the coding apparatus side through a motion vector information input terminal 27 to obtain a predictive signal to deliver it as an addition signal to the adder 22 through terminals 23b and 23c of the changeover switch 23.

Further, the changeover switch 23 is switched, by independent information transmitted from the coding apparatus side through an independent input terminal 28, not to the 23b side (output of the motion compensator 26), but to the fixed value (0) on the 23a side, thus to inhibit interframe prediction.

As an actual example of the previously described coding and decoding apparatuses standardized (H. 261) for use in a Television Conference, or a Television Telephone in the Consultive Committee of International Telegram & Telephone (CCITT).

In an interframe predictive coding as described above, the efficiency is high because correlation between frames is effectively utilized. However, in order to realize application to storage (recording) system media, it is required for carrying out random access, high speed search or image editing to independently conduct coding within a frame without using prediction between several frames.

While an employment of an increased rate of frames caused to be independent becomes easy to cope with editing, etc. by the increased rate, the efficiency is lowered, so that a quantity of codes generated increases. Particularly, when an attempt is made to carry out editing every one frame (replacement of image), it is necessary that respective frames are independent, giving rise to inconveniences such that the interframe prediction is unable to be used.

Further, in the case of the interframe predictive processing, when an image correlation between frames is lowered to some extent, a quantity of codes of predictive residuals can become greater than that in the case where coding is independently carried out within a frame without using prediction. For this reason, there are instance where a method of independently carrying out coding within a frame is rather desirable. In these instances, it took place the inconvenience that it is necessary to make the respective characteristics of the intraframe coding with respect to a predictive residual and a raw image to be different from each other.

SUMMARY OF THE INVENTION

This invention has been made by drawing attention to the above-described problems, and its object is to provide efficient coding/decoding apparatuses adapted for independently coding respective frames within a frame to allow an error occurring between an original image signal and a coded reproduced image signal be exerted on other frames to carry out an addition between frames on the decoding side to lessen error signals so that respective frames can be independently handled, thereby making it possible to easily carry out, without degradation in picture quality, random access, high speed search or image editing necessary in media of the storage system, to provide a coding efficiency closer to that of the interframe predictive coding by reduction of an error, to improve efficiency to more degree rather than that in the predictive coding particularly in the case where a correlation between frames is low, to provide a reproduced image desirable from a visual point of view, and to employ a simple construction.

In order to solve the above-described problems, this invention provides:

(1) An efficient coding apparatus for use in a coding processing utilizing correlation between frames or fields of an image signal comprising; means for obtaining a signal component including a negative error signal provided by subtracting a reproduced image signal obtained by coding/decoding from an original image signal which has not undergone interframe/interfield coding processing, and means for adding the signal component including the negative error signal to input image signals of other frames or fields;

(2) an efficient coding apparatus comprising; means for detecting the degree of matching every block or pixel of an image between frames or fields where interframe or interfield processing is carried out, and adding means such that when the degree of matching is high, the adding means is operative to increase the rate of a signal component including a negative error signal to add it to input image signals of other frames or fields, while when the degree of matching is low, the adding means is operative to decrease the rate of a signal component including a negative error signal to add it to those input image signals.

(3) an efficient coding apparatus comprising; means for detecting the degree of matching every block or pixel of an image between frames or fields where interframe or interfield processing is carried out, and an quantization means such that when the degree of matching is high, the quantization means is operative to allow a quantization step to be coarse, while when the degree of matching is low, the quantization means is operative to allow the quantization step to be fine.

(4) an efficient coding apparatus comprising; means for detecting the degree of matching every block or pixel of an image between frames or fields where interframe or interfield processing is carried out, means for controlling a quantization step, and adding means such that when the quantization step is caused to be coarse, the adding means is operative to increase the rate of a signal component including a negative error signal to add it to input image signals of other frames or fields, while when the quantization step is caused to be fine, the adding means is operative to decrease the rate of a signal component including a negative error signal to add it to those input image signals, (5) an efficient decoding apparatus comprising; means for adding reproduced image signals of other frames or fields to a current or present reproduced image signal in decoding coded data of an image in which error signals of other frames or fields are included, and (6) an efficient decoding apparatus comprising; means for detecting the degree of matching every block or pixel of a reproduced image between frames or fields where interframe or interfield processing is carried out, and adding means such that when the degree of the matching is high, the adding means is operative to increase the rate of reproduced image signals of other frames to add them to a current or present reproduced image signal, while when the degree of the matching is low, the adding means is operative to increase the rate of a current reproduced image signal to add it to reproduced image signals of other frames or fields.

In this invention, a scheme is employed to independently carry out coding within respective frames to allow errors between an original image and a coded reproduced image, which takes place by quantization error, to be exerted on other frames, and to cancel such errors by additive processing between frames on the decoding side.

In actual terms, when the coefficient of the coding side is assumed as Ke and the coefficient of the decoding side is assumed as Kd, an approach is employed to multiply an error of a frame by the coefficient Ke (0~1) to subtract it from an original image of the next frame to encode the subtracted image to further subtract an error of the coded image from an original image of the further next frame. On the decoding side, an approach is employed to multiply an image of a last frame by the coefficient Kd (0~0.8), and to multiply a reproduced image of the present frame by (1-Kd).

The values of the coefficients Ke and Kd are changed depending upon degree of matching of respective images. Namely, in the case where correlation is high and respective images match with each other to much degree, those values are caused to be large. In contrast, in the case where correlation is low and respective images match with each other to less degree, those values are caused to be small.

Further, in the additive/subtractive processing between frames, motion compensation is carried out in the same manner as in the case of the interframe prediction.

Since respective frames are independently coded, random access, search or editing can be carried out with ease. Further, since an error of a frame is caused to be exerted on other frame, an error of the next frame becomes apt to have an opposite polarity if an image is unchanged. Accordingly, when an additive processing between frames is carried out on the decoding side, most of errors are canceled, resulting in extremely small quantity of remaining errors. In addition, since a quantity of additive/subtractive processing is reduced in dependency upon the degree of correlation at the portion where there is any change in an image, there is no possibility that blurring by movement or motion may take place, although a quantity of lessened errors is reduced.

By using a motion compensation, high interframe correlation is provided at most portions of an image, so error is considerably lessened. Accordingly, in the case of attempting to obtain the same picture quality, quantization can be considerably coarse, so a quantity of data generated can be reduced.

In this instance, the efficiency is improved to more degree than that in the case where coding is independently carried out even at the portion where interframe correlation of an image is relatively low. For this reason, in such a case, the efficiency becomes higher than that of the interframe predictive coding. Thus, the degree of changes of a data quantity, which takes place by the property of an image, becomes small.

As stated above, in accordance with efficient coding/decoding apparatuses according to this invention, an approach is employed to independently encode respective frames within a frame to allow respective errors occurring between original image signal and corresponding coded reproduced image signal to be exerted on other frames to carry out an addition between frames on the decoding side to lessen error signals so that respective frames can be independently handled, thereby making it possible to easily carry out, without degradation in picture quality, random access, high speed search or image editing necessary in media of the storage system, to provide a coding efficiency closer to that of the interframe predictive coding by reduction of an error, to improve efficiency to more degree rather than that in the predictive coding particularly in the case where a correlation between frames is low, to provide a reproduced image desirable from a visual point of view, and to employ a simple construction.

DETAILED DESCRIPTION OF THE PREFERRED EMBODIMENTS

Figure 3:
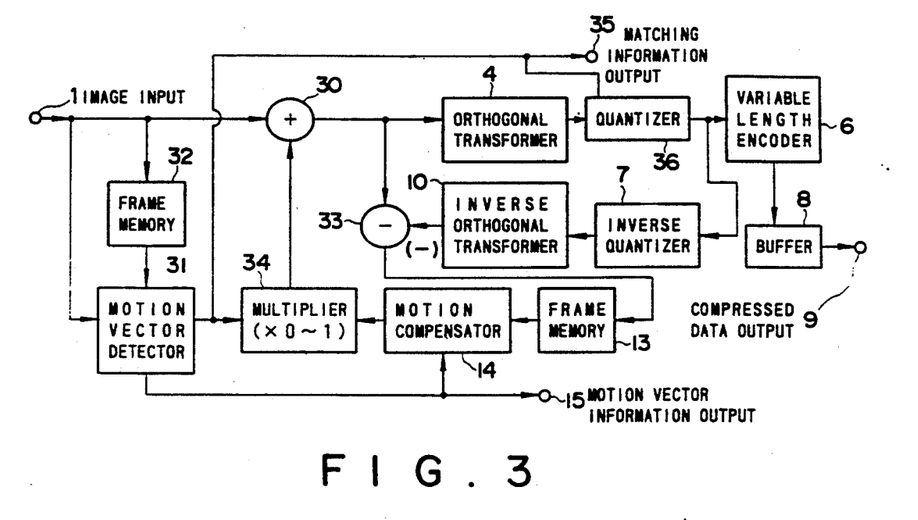
FIG. 3 is a block diagram showing a first embodiment of an efficient coding apparatus according to this invention.

FIG. 3 is a block diagram showing a first embodiment of an efficient coding apparatus according to this invention wherein the same reference numerals are respectively attached to the same portions as those in FIG. 1, and their explanation will be omitted.

In FIG. 3, an original image signal inputted from an image input terminal 1 is delivered to an adder 30, a motion vector detector 31, and a frame memory 32. The adder 30 adds a negative error signal which will be described later to the original image signal to deliver an added signal to orthogonal transformer 4 and a subtracter 33.

The operation at the orthogonal transform element 4 and components succeeding thereto is essentially the same as that in the prior art. The interframe prediction of the prior art is the processing for a predictive residual, whereas, in this embodiment, such interframe prediction is the processing substantially for an original image signal because an error signal is small although a negative error signal is added thereto. Accordingly, the quantization step, and the variable length coding, etc. somewhat differ from those of the prior art, and basically becomes equivalent to the case where coding is independently carried out within a frame. On the other hand, a quantized signal is delivered to an inverse-quantizer 7 in the same manner as in the prior art. Thus, a reproduced image signal is provided by the inverse-quantizer 7 and an inverse orthogonal transformer 10.

An output signal of the inverse orthogonal transformer 10 was a reproduced image signal of a predictive residual in the prior art, but is a reproduced image signal of an original image in this embodiment. A subtracter 33 subtracts an output signal of the inverse orthogonal transformer 10 from an output signal of the adder 30 to obtain a negative error signal occurring in the intraframe coding/decoding processing to deliver it frame memory 13. The frame memory 13 delays the negative error signal by one frame to deliver it to motion compensator 14.

Here, since the amplitude of the negative error signal is extremely smaller than that of the original image signal, when the amplitude of the negative error signal is limited before that signal is inputted to the frame memory 13, the number of bits of the frame memory can be reduced. If the original image signal is 8 bits (i.e., 0~255) as an example, the number of bits of the frame memory can be reduced to 4 bits (−7~+7). Thus, the capacity of the frame memory 13 can be one half.

The motion compensator 14 implements motion compensation processing to an output signal of the frame memory 13 in correspondence with a motion vector value delivered from the motion vector detector 31 to obtain a motion compensated negative error signal to deliver it to a multiplier 34.

The motion vector detector 31 outputs matching information to deliver it to the decoding apparatus side through a matching information output terminal 35, and to deliver it to a quantizer 36 and the multiplier 34.

In the case where matching is good, an additive processing between frames is carried out on the decoding apparatus side, so an error is lessened, whereas in the case where matching is bad, a quantity of lessened errors becomes small, or there is no lessening of errors, so the picture quality is lowered. To improve this, the motion vector detector 31 carries out the above-mentioned operation. In the case where matching is bad, the quantizer 36 becomes operative to allow the quantization step to be fine to improve the picture quality so that the entirety thereof is well-balanced.

It is to be noted that the portion where matching is bad is the portion where an image abruptly changes, and degradation in the picture quality is difficult to be visually conspicuous. Accordingly, it is unnecessary to entirely implement improvement of the picture quality by additive processing between frames.

The degree of matching is determined by taking absolute values of differences between corresponding pixels of two images and averaging the absolute values. In this embodiment, setting is made such that the quantization step is caused to be fine relatively by about 15% every time the average value of the absolute values increments by 2 from zero, and is caused to be the same when the average value of absolute values is more than 6.

The multiplier 34 multiplies the motion compensated negative error signal by the coefficient Ke (0~1) determined by information indicative of the degree of matching of an optimum motion vectors outputted from the motion vector detector 31 to deliver it to the adder 30.

Setting of the above-mentioned coefficient Ke is made depending upon the degree of matching. Namely, when the average value of absolute values is less than about 3, the coefficient Ke is set to 1. When the average value of absolute values is above about 3, the coefficient Ke is set to a value less than 1. When the average value of absolute value is about 7, the coefficient Ke is equal to zero.

It is to be noted that since the average of absolute values of pixel differences between two images is calculated in order to determine a motion vector, the motion vector detector 31 is only required to output, every block, an optimum vector corresponding to a minimum value. Accordingly, supplement of processing is not required in particular.

The motion vector detector 31 searches, every about 16×16 pixels, motion of an image between an original image signal from the image input terminal 1 and a signal earlier by one frame from the frame memory 32 to obtain most accurate motion vector information to deliver it to the decoding apparatus side through the motion vector information output terminal 15, and also to the motion compensator 14.

Here, a signal earlier by one frame is required at the motion vector detector 31. Since this signal must correspond to the original image, an output signal of the frame memory 13, which is obtained by delaying the negative error signal by one frame, is not used. Separately from this, it is necessary to provide frame memory 32 for an original image signal. For this reason, two frame memories in total are required. Since it is sufficient that the frame memory 13 for error signal has a capacity one half of that of the prior art, it is enough that the entire memory capacity is about 1.5 times that of the prior art.

By processing as described above, an image signal in which an error signal of a last frame is subtracted at the portion where correlation of images is high is subjected to intraframe coding by the processing succeeding to the orthogonal transform processing.

Figure 4:
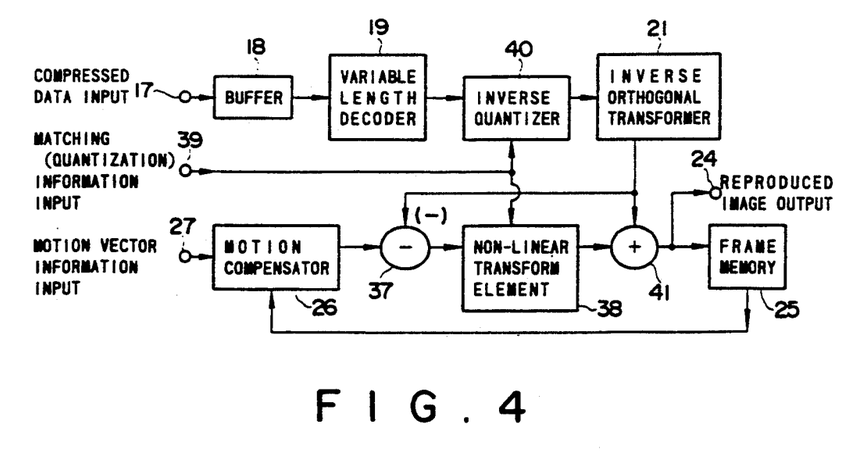
FIG. 4 is a block diagram showing an embodiment of an efficient decoding apparatus according to this invention.

FIG. 4 is a block diagram showing an embodiment of an efficient decoding apparatus wherein the same reference numerals are respectively attached to the same portions as those in FIG. 2, and their explanation will be omitted.

In FIG. 4, while the operation from the buffer 18 up to the inverse orthogonal transformer element 21 is the same as that in the prior art shown in FIG. 2, but parameter setting corresponding to the intraframe independent coding is made in correspondence with the coding apparatus.

The inverse orthogonal transformer 21 implements an inverse orthogonal transform processing to an input signal to obtain a reproduced image signal to deliver it to a subtracter 37. The subtracter 37 subtracts the reproduced image signal which is an output signal of the inverse orthogonal transformer 21 from a motion compensated reproduced image signal of a last frame outputted from the motion compensator 26 to deliver it to a non-linear converter 38.

On the other hand, matching information transmitted from the coding apparatus through a matching information input terminal 39 is delivered to the non-linear converter 38 and an inverse quantizer 40.

The non-linear converter 38 is controlled by matching information to implement non-linear conversion to an input signal to deliver it to an adder 41. The adder 41 adds the reproduced image signal which is an output signal of the inverse orthogonal transformer 21 and an output signal of the non-linear converter 38 to output it as a reproduced image signal through reproduced image output terminal 24, and to deliver it also to frame memory 25.

The frame memory 25 delays the reproduced image signal by one frame thereafter to deliver it to motion compensator 26. The motion compensator 26 implements motion compensation processing to a reproduced image signal of a last frame by motion vector information transmitted from the coding apparatus side through the motion vector information input terminal 27 to obtain a motion compensated reproduced image signal of a last frame to deliver it to the subtracter 37.

Here, the subtracter 37, the non-linear converter 38 and the adder 41 are provided for multiplying an original image signal by (1−Kd), and for multiplying a signal earlier by one frame by Kd to add them. The coefficient multiplied at the non-linear converter 38 is Kd. When Kd is equal to zero, i.e., an output signal of the non-linear converter 38 is equal to zero, an original image signal is outputted as it is. On the other hand, when Kd is equal to 1, i.e., an output signal of the non-linear converter 38 is the same as an input signal, the original image signal is canceled by subtraction and addition, so a signal earlier by one frame is provided as an output signal as it is.

It is to be noted that the coefficient Kd will vary by an input signal of the non-linear converter, i.e., an interframe difference signal in correspondence with the non-linear conversion characteristic.

Figure 5:
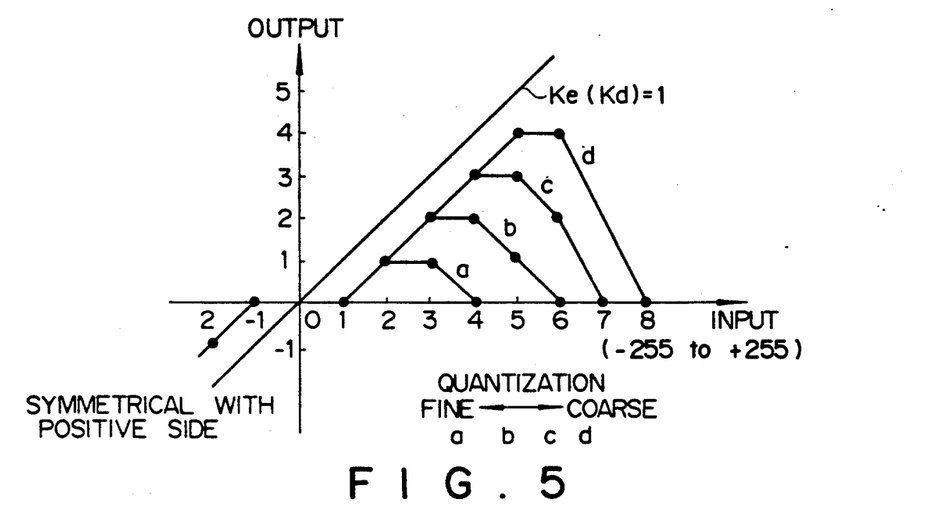
FIG. 5 is a diagram showing an example of the characteristic of non-linear transformation.

FIG. 5 is a diagram showing an example of the characteristic of the non-linear conversion wherein the abscissa and the ordinate represent an input and an output, respectively. This Figure is used in common to both the coding apparatus and the decoding apparatus. Accordingly, the coefficient is represented by Ke in the case of the coding apparatus, and the coefficient is represented by Kd in the case of the decoding apparatus. When the absolute value of an input is small, the coefficient Ke (Kd) is equal to a value close to 1. When the absolute value of an input becomes large, the coefficient Ke (Kd) becomes small. When the absolute value of an input is above 8, the coefficient Ke (Kd) becomes equal to zero. The conversion characteristic is varied by matching information in correspondence with changes in the quantization step. Namely, in the case where matching is bad, so quantization step is fine (a side in FIG. 5), the coefficient Ke (Kd) is caused to be immediately small.

It is to be noted that the reason why the coefficient Ke of the coding apparatus is roughly set every block is that error signals having a small amplitude are added in the coding apparatus, whereas the reason why the coefficient Kd of the decoding apparatus is changed every pixel is that since image signals of different frames are handled in the decoding apparatus, there is the possibility that images considerably differ positionally even within a block, with the result that degradation in the picture quality is apt to occur by the additive processing if the coefficient Kd is kept constant within the block.

Comparison between the above-described technique of this invention and the conventional predictive processing will be made. The manners of utilizing correlation between frames with respect to the invention and the prior art are different as follows. Namely, in the case of the interframe prediction, attention is drawn to the fact that since a difference between frames is small, coding can be carried out with a less quantity of codes. On the contrary, in the case of the technique of the invention, the feature resides in that quantization is rather roughly carried out to allow an error to be exerted on other frames on the premise that the interframe additive processing can be carried out on the decoding side.

Figure 7:
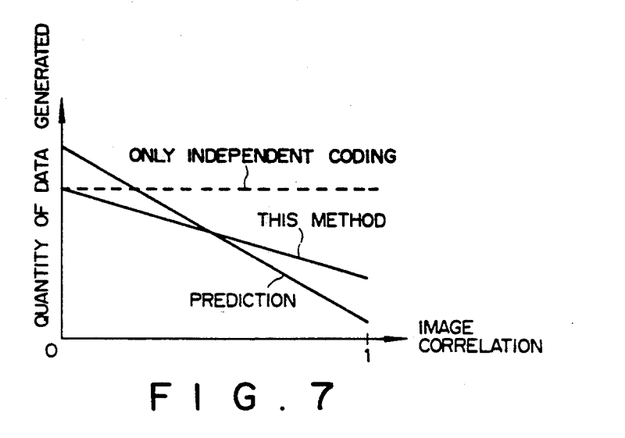
FIG. 7 is a diagram showing, in a comparative manner, coding efficiencies in the technique employed in this invention and a conventional predictive processing.

FIG. 7 is a diagram showing coding efficiencies in the technique of this invention and the conventional predictive processing wherein the abscissa and the ordinate represent an image correlation and a quantity of data generated.

In FIG. 7, in the case of both the technique of the invention and the conventional predictive processing, according as the interframe correlation becomes higher (the correlation becomes close to 1), the quantity of data becomes less.

Since the predictive residual is equal to zero in the case where images are entirely the same, it is possible to reduce a quantity of data generated to a value close to zero. On the contrary, in the case of this technique, even if quantization is caused to be coarse, data is inevitably generated to some extent in order to encode an original image. In this respect, the technique of the invention is inferior to the predictive processing.

On the other hand, in the case where correlation is low (correlation is close to zero), this is represented by a differential component in the predictive processing. For this reason, a quantity of data rather becomes greater than that in the case of the intraframe independent coding. However, in the case of this technique, a quantity of data is the same as that of the intraframe independent coding at the worst. If any correlation can be utilized, a quantity of data can be reduced accordingly. Rather, this technique is advantageous to the predictive coding. Accordingly, in the case where this technique is used, a change in the picture quality at the time of a fixed rate becomes small.

By both the coding processing and the decoding processing, an error is lessened to much degree. Study of how an error is lessened by a single processing only the coding side or decoding side will be conducted.

Initially, in the case of a single processing only on the coding side, there occurs a phenomenon such that an error is diffused to the high frequency band side in a time direction. This is in conformity with the visual characteristic, but noise may move even if an image is stationary.

Further, in the case of a single processing only on the decoding side, errors occurring at random are lessened to some degree. However, since errors take the same value if images are the same, there results no improvement by adding them.

On the other hand, execution of the additive processing on the decoding side in the predictive coding is no more than reduction of an interframe predictive residual. This is meaningless. In view of these discussions, it is considered that this invention holds both on the coding side and on the decoding side.

Figure 6:
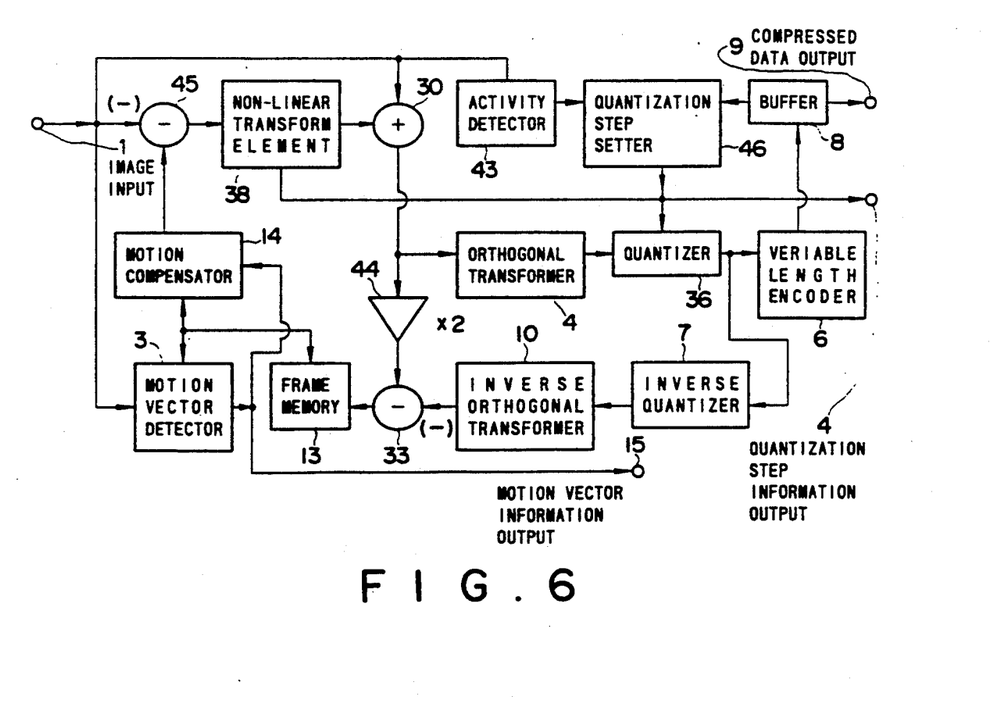
FIG. 6 is a block diagram showing a second embodiment of an efficient coding apparatus according to this invention.

FIG. 6 is a block diagram showing a second embodiment of an efficient coding apparatus according to this invention wherein the same reference numerals are respectively attached to the same portions as those of FIGS. 1 and 3, and their explanation will be omitted. The major difference between the coding apparatus of this embodiment and the coding apparatus of FIG. 3 is as follows. Namely, in FIG. 3, only a negative error signal (coded error) is used for feedback. In contrast, in FIG. 6, signal component including a negative error signal, i.e., a signal in which a negative error signal is added to an original image signal is used. Thus, it is sufficient to use a single frame memory, and addition of errors can be carried out every pixel.

In FIG. 6, an original image signal inputted from image input terminal 1 is delivered to adder 30, motion vector detector 3, and an activity detector 43. The adder 30 adds an output signal of the non-linear converter 38 which will be described later to the original image signal to deliver it to orthogonal transformer 4 and a doubler 44.

The operation from the orthogonal transformer 4 to the inverse orthogonal transformer is the same as that of the prior art shown in FIG. 1. An output signal of the inverse orthogonal transform element 4 serves as a reproduced image signal of an original image, i.e., (original image signal+error signal). The doubler 44 amplifies an output signal of the adder 30 so that it becomes double to deliver it to subtracter 33. The subtracter 33 subtracts an output signal of the inverse orthogonal transformer 10 from an output signal of the doubler 44, i.e., carries out an operation of 2×original image signal−(original image signal+error signal) to obtain a signal component including a negative error signal, i.e., (original image signal+error signal) to deliver it to the frame memory 13. The frame memory 13 delays an input signal by one frame thereafter to deliver it to motion compensator 14 and motion vector detector 3.

The motion vector detector 3 searches, every about 16×16 pixels, motion of an image between an original image signal from the image input terminal 1 and (original image signal−error signal) earlier by one frame from the frame memory 13 to obtain the likeliest motion vector information to deliver it to the decoding apparatus side through the motion vector information output terminal 15, and to deliver it also to the motion compensator 14.

The motion compensator 14 implements motion compensation processing to an output signal of the frame memory 13 in correspondence with a motion vector value delivered from the motion vector detector 3 to obtain a motion-compensated (original image signal−−error signal) earlier by one frame to deliver it to subtracter 45. The subtracter 45 subtracts the original image signal inputted from the image input terminal 1 from the motion-compensated (original image signal−−error signal) earlier by one frame to deliver it to the non-linear converter 38.

On the other hand, the activity detector 43 detects or determines an activity of an image every orthogonal transform block or motion compensation block to deliver it to a quantization step setter 46.

The quantization step setter 46 is controlled by two parameters of information of a quantity of data delivered from the buffer 8 and activity to obtain information of the quantization step to deliver it to the decoding apparatus side through quantization step information output terminal 47, and to deliver it also to the non-linear converter 38 and the quantizer 36.

The operation of the quantization step setter 46 is as follows. Namely, in the case where a quantity of data stored in the buffer is great, since it is necessary to reduce a quantity of data generated, the quantization step is caused to be coarse. Further, since degradation is difficult to be visually conspicuous at portions where the activity is high of respective blocks, the quantization step is caused to be coarse.

The operations of the subtracter 45, the non-linear converter 38 and the adder 30 are the same as those of the subtracter 37, the non-linear converter and the adder 41 in the decoding apparatus shown in FIG. 4. Namely, original image signal and (original image signal−error signal) earlier by one frame are compared with each other. As a result, in the case where a difference therebetween is small, the (original image signal−−error signal) earlier by one frame results in a signal to be coded. In contrast, in the case where that difference is large, the original image signal results in a signal to be coded.

Namely, in the case of FIG. 3, only a negative error signal is added. On the contrary, in the case of FIG. 6, an image signal itself is replaced. Thus, a frame additive operation of an image is carried out. The circuit section including the non-linear converter 38 of FIG. 6 operates as a filter in a time direction so that the noise component is lessened.

The non-linear converter 38 implements a non-linear conversion processing to an input signal in correspondence with a quantization step changing in dependency upon control of the data rate and the activity of an image to deliver it to the adder 30.

The operation of the non-linear converter 38 is as follows. Namely, in the case where the quantization step is caused to be coarse, the range of an input value serving as a large coefficient Ke is widened. Thus, even if there is a difference to some extent, the time filter is caused to be effective to more degree (d side in FIG. 5). In contrast, in the case where the quantization step is fine, since an error produced by coding becomes small, the range of a difference signal subject to filtering is narrowed, thus allowing a change in an image not to be subjected to filtering (a side in FIG. 5).

In this embodiment, the quantizer 36 quantizes an input signal at a quantization step corresponding to quantization step information delivered from the quantization step setter 46.

As a decoding apparatus corresponding to the coding apparatus of FIG. 6, the decoding apparatus shown in FIG. 4 can be used as it is. This is because matching information in FIG. 3 may help to conduct control of the quantization step.

While the processing of FIGS. 3, 4 and 6 is directed to the processing between respective adjacent two frames, it is conceivable, in the same manner as in the conventional predictive processing, also in this technique to adopt various processing between fames, or between fields.

Figure 8A:
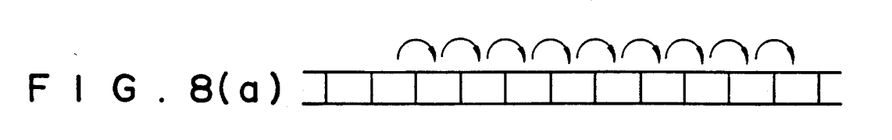
FIGS. 8a-8c are diagrams for explaining the processing every frame of a non-interlaced signal.
Figure 8B:
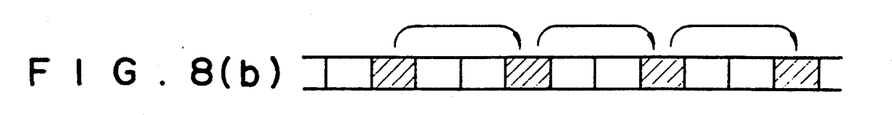
Figure 8C:
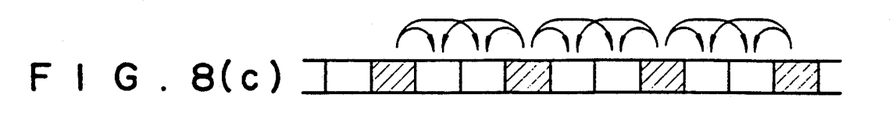

FIGS. 8(a) to 8(c) are views for explaining processing every frame of a non-interlaced signal. In these Figures, squares represents respective frames, and arrows represent frame pairs from which errors therebetween are given. FIG. 8(a) shows the basic case where each error between a frame and only a last frame (frame earlier only by one frame) is used. FIGS. 8(b) and 8(c) show processing proposed by the standardization of ISO/IEC. Namely, FIG. 8(b) shows a processing of the first stage where each error between frames jumping by several frames (three frames in the Figure) is used. FIG. 8(c) shows a processing from frames of the first stage (frames indicated by slanting lines) with respect to frames caused to be jumped by the processing of the first stage. Since the processing of the second stage FIG. 8(c) is a processing from preceding and succeeding two frames, although a plurality of methods such as a method of using only the preceding frame, a method of using only the succeeding frame, and a method of using addition between preceding and succeeding frames, etc. are conceivable, alteration of the processing in that case is similar to alteration in the case of the predictive processing.

FIGS. 9(a) to 9(d) are views for explaining the processing every field of an interlaced signal. In these Figures, squares represent respective fields, and arrows frame pairs from which errors therebetween are given. Because of the interlaced signal, there is a time shift of ½ frame between even fields and odd fields.

Figures 9A, 9B, 9C, 9D:
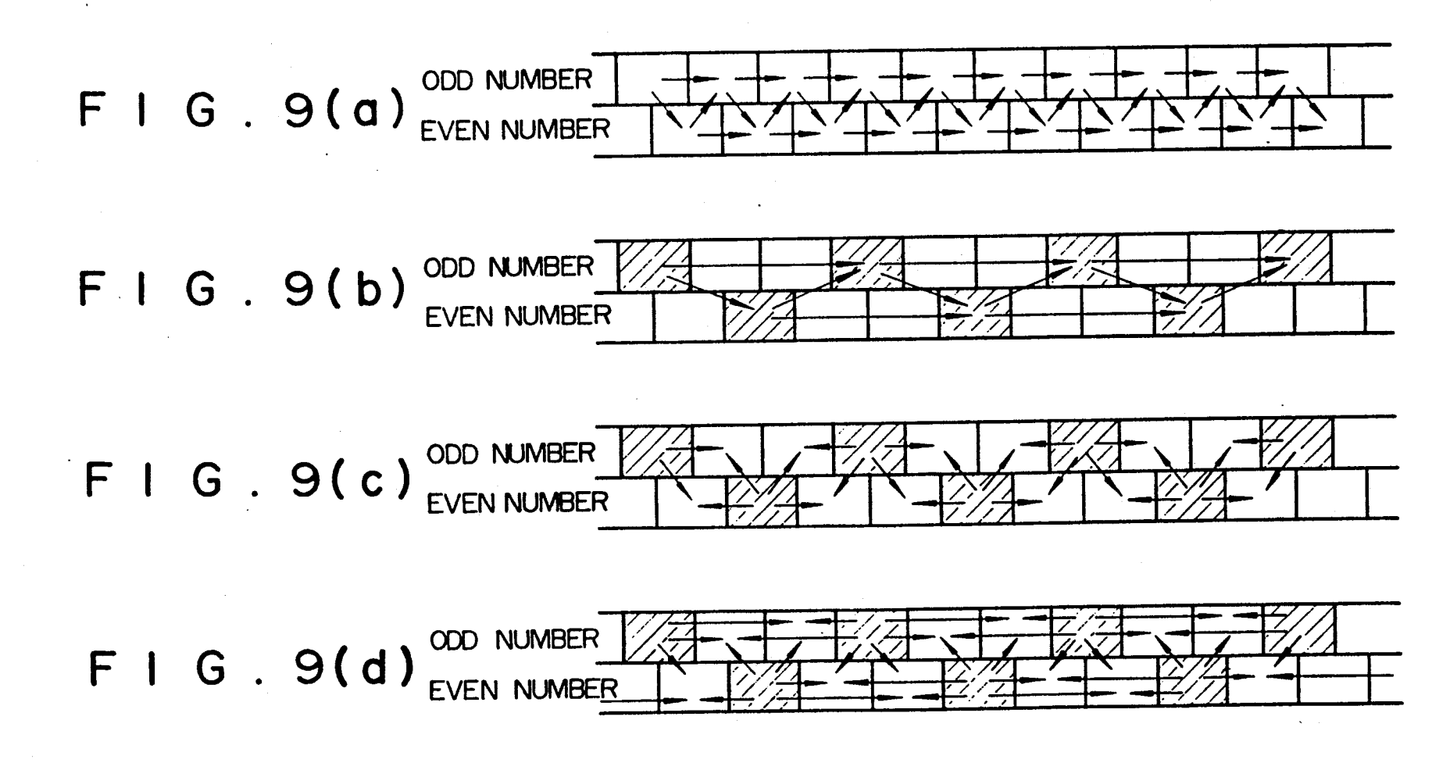
FIGS. 9a-9d are diagrams for explaining the processing every field of a non-interlaced signal.

FIG. 9(a) shows the processing from a last frame and a last field, which is proposed by the standardization of CCIR/CCITT. FIGS. 9(b) and 9(c) show the processing expanded to the processing between fields wherein processing between fields jumping by three fields is carried out with respective even and odd fields. Namely, in the processing of FIG. 9(b), errors between even jumping fields, errors between odd jumping fields, and errors between even and odd fields are used. Further, in the processing of FIG. 9(c), errors between even and odd jumping fields and those preceding and succeeding thereto are used. It is to be noted that since if only fields earlier by three fields are used in FIG. 9(b), there result solely fields having an even and odd relationship opposite to that of a current field, it is suitable to use fields earlier by three frames, which are earlier further by three fields.

On the other hand, FIG. 9(d) shows a processing obtained by developing the processing of FIG. 9(c) wherein three fields before and after are used. In this case, since fields having the same odd and even relationship are present before and after, it is possible to maintain correlation between images at a high level.

It is to be noted that while arrows in FIGS. 8(a) to 8(c) are represented by curves outside the squares, and arrows in FIGS. 9(a) to 9(d) are represented by straight lines inside squares, such an indication is adopted for convenience of drawing Figures. This is not particularly meaningful.

As stated above, the interframe processing system and the interfield processing system of this technique are similar to the predictive processing. Accordingly, processing which can be used in the predictive processing may be basically used in this invention. Further, in the case of a system of two stages, an approach may be employed such that the processing of the first stage is carried out by this technique and the processing of the second stage is by the predictive processing, and vice versa. Particularly, in the case of interlaced interframe processing, the interframe correlation is easy to be lower. Accordingly, this technique is advantageous.

On the other hand, in the case of the predictive processing from fields or frames before and after, correlation becomes high, so the prediction becomes effective. Accordingly, when an approach is employed such that the processing of the first stage is carried out by this technique and the processing of the second stage is carried out by the predictive processing, there is the possibility that coding efficiency rather becomes higher than that in the conventional all predictive coding methods while maintaining independency every several frames (fields). This is extremely advantageous.

In the combination with the intraframe processing by the orthogonal transform processing, a quantization noise called a mosquito noise was apt to be conspicuous at the periphery of the edge. On the contrary, in the case of this technique, since there is no difference between frames at a flat portion, addition between frames is permitted to be carried out. Thus, noise is lessened to much degree.

On the other hand, in the case where motion compensation processing is carried out, when the predictive processing is employed, there are instances where motion may become unnatural depending upon the degree of motion compensation. On the contrary, in the case of this technique, when a motion-compensated image shifts with respect to an original image, a value corresponding to that shift is not added, and the original image is instead adopted. Accordingly, the rate of noise reduction becomes small, but there is no possibility that motion becomes unnatural. For these reasons, a reproduced image desirable from a visual point of view can be provided.

Since this technique is basically an intraframe independent coding, it is sufficient to prepare parameters for independent coding as the parameter for intraframe coding processing. Thus, the configuration becomes simple.

What is claimed is:

1. An efficient coding apparatus for use in a coding processing utilizing correlation between frames or fields of an image signal, comprising:
    means for obtaining a signal component including a negative error signal provided by subtracting a reproduced image signal obtained by coding/decoding from an original image signal which has not undergone interframe/interfield coding processing, and
    means for adding the signal component including the negative error signal to input image signals of other frames or fields; and further comprising:
    means for coding said image signal to output a coded signal, said means for coding comprising an orthogonal transformer and a quantizer, wherein said orthogonal transformer orthogonally transforms a predictive residual every block consisting of a plurality of pixels to output a transformed signal, and said quantizer quantizes said transformed signal to output a quantized signal as said coded signal;
    means for decoding said coded signal to output a decoded signal, said means for decoding comprising an inverse quantizer and an inverse orthogonal transformer, wherein said inverse quantizer performs an inverse-quantization on said coded signal to output an inverse-quantized signal, and said inverse orthogonal transformer performs an inverse-orthogonal-transformation on said inverse-quantized signal to output said decoded signal;
    subtraction means for generating said negative error signal which occurs in an intraframe coding/decoding processing by subtracting said decoded signal from said image signal; and
    a frame memory for storing said negative error signal for future use in compensating for a motion of said image signal.

2. An efficient coding apparatus as set forth in claim 1, further comprising:
    means for detecting the degree of matching every block or pixel or an image between frames or fields where interframe or interfield processing is carried out, and
    adding means such that when the degree of matching is high, the adding means is operative to increase the rate of the signal component including a negative error signal to add it to input image signals of other frames or fields, while when the degree of matching is low, the adding means is operative to decrease the rate of the signal component including a negative error signal to add it to said input image signals.

3. An efficient coding apparatus for use in a coding processing utilizing correlation between frames or fields of an image signal, comprising:
    means for obtaining a signal component including a negative error signal provided by substracting a reproduced image signal obtained by coding/decoding from an original image signal which has not undergone interframe/interfield coding processing, and
    means for adding the signal component including the negative error signal to input image signals of other frames or fields; and further comprising:
    means for detecting the degree of matching every block or pixel of an image between frames or fields where interframe or interfield processing is carried out, and quantization means such that when the degree of matching is high, the quantization means is operative to allow a quantization step to be coarse, while when the degree of matching is low, the quantization means is operative to allow the quantization step to be fine.

4. An efficient coding apparatus for use in a coding processing utilizing correlation between frames or fields of an image signal, comprising:

means for obtaining a signal component including a negative error signal provided by substracting a reproduced image signal obtained by coding/decoding from an original image signal which has not undergone interframe/interfield coding processing, and means for adding the signal component including the negative error signal to input image signals of other frames or fields; and further comprising:

means for detecting the degree of matching every block or pixel of an image between frames or field where interframe or interfield processing is carried out, means for controlling a quantization step, and adding means such that when the quantization step is caused to be coarse, the adding means is operative to increase the rate of a signal component including a negative error signal to input image signals of other frames or fields, while when the quantization step is caused to be fine, the adding means is operative to decrease the rate of a signal component including a negative error signal to add it to those input image signals.

5. An efficient decoding apparatus comprising means for adding reproduced image signals of other frames of fields to a current or present reproduced image signal in decoding coded data of an image in which error signals of other frames or fields are included; wherein said apparatus further comprises decoding means for decoding said coded data of said image to a reproduced image signal, said decoding means comprising a buffer, a variable length decoder, an inverse quantizer and an inverse orthogonal transformer, a frame memory for storing a reproduced image output which is generated by adding an output of said inverse orthogonal transformer with a motion compensated signal, means for detecting the degree of matching every block or pixel of a reproduced image between frames or fields where interframe or interfield processing is carried out, and said means for adding being such that when the degree of the matching is high, the means for adding is operative to increase the rate of reproduced image signals of other frames to add them to a current or present reproduced image signal, while when the degree of the matching is low, the means for adding is operative to increase the rate of a current reproduced image signal to add it to reproduced image signals of other frames or fields.

* * * * *